Dec. 29, 1925.  
C. E. WEBBER  
HARROW  
Filed July 1, 1925  
1,567,778  
2 Sheets-Sheet 1
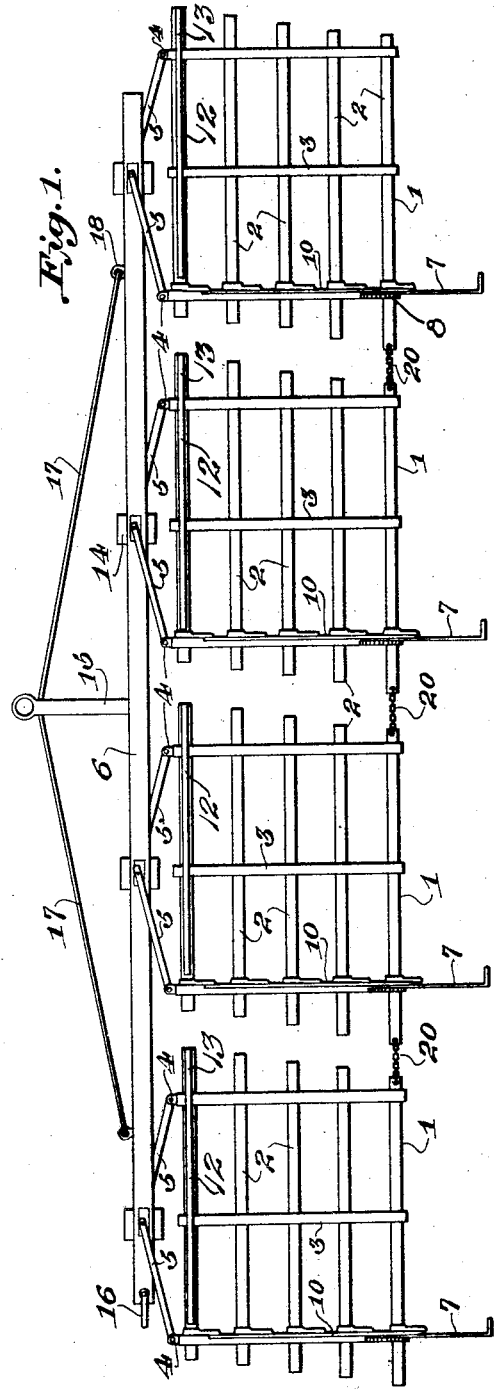
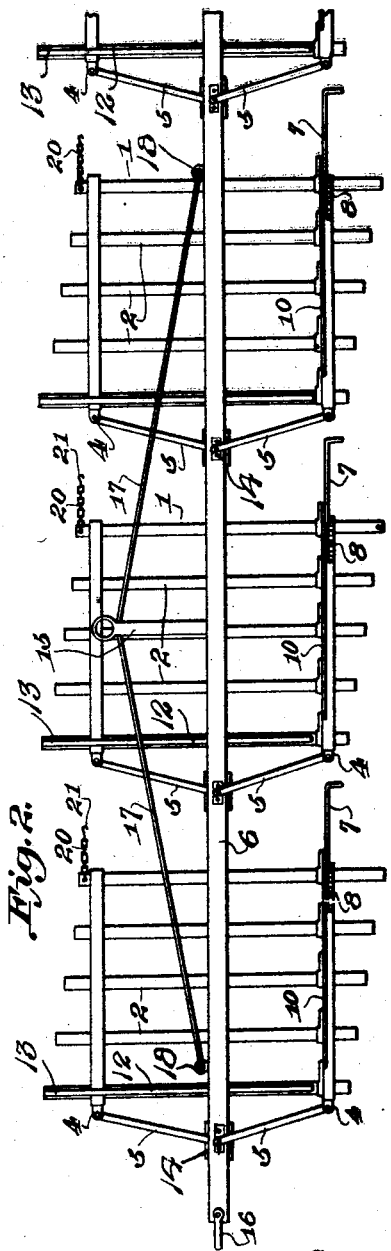
Inventor  
C. E. Webber.  
By William E. Sinton.  
Attorney Dec. 29, 1925.　　　　C. E. WEBBER　　　　1,567,778

HARROW

Filed July 1, 1925　　　2 Sheets-Sheet 2

Inventor
C. E. Webber.
By William C. Sinton.
Attorney

Patented Dec. 29, 1925.

1,567,778

UNITED STATES PATENT OFFICE.

CHARLES E. WEBBER, OF PONTIAC, ILLINOIS.

HARROW.

Application filed July 1, 1925. Serial No. 40,901.

*To all whom it may concern:*

Be it known that I, CHARLES E. WEBBER, a citizen of the United States of America, residing at Pontiac, in the county of Livingston and State of Illinois, have invented certain new and useful Improvements in Harrows; and I do hereby declare that the following is a full, clear, concise, and exact description of the invention, such as will enable others skilled in the art to which it appertains to make and use the same.

This invention relates to improvements in harrows of the so-termed "gang" type, wherein a plurality of sections are employed, the invention having for an object to provide a novel form of harrow so constructed that during usage of the same, the various sections thereof can be drawn abreast over a field to be worked thereby, whereupon with completion of the harrowing, a different connection of the draft bar with the draft means may be effected in such a manner as to cause automatic readjustment of said sections so that they will be arranged in single file relation, that is, one following the other, hence, permitting the harrow to be readily drawn along without interference, through gate ways or other relatively narrow ways, from a field to other different points or fields.

It is likewise an equally important object of the invention to provide a harrow of the character mentioned wherein the sections thereof are so constructed as to permit of swinging motion of the same without interference with each other, yet ensuring, with arrangement in opposite relation, full and complete engagement with the surface of a field being harrowed, thereby avoiding any unharrowed strips or areas.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one embodiment of the same.

In these drawings:—

Figure 1 is a plan view of the improved harrow showing the harrow sections in operative position whereat they are to be drawn abreast over a field or other surface;

Figure 2 is a similar view wherein the harrow sections are arranged in their readjusted and inoperative position, as when the device is to be drawn or removed from a field through narrow ways to other points;

Figure 3:
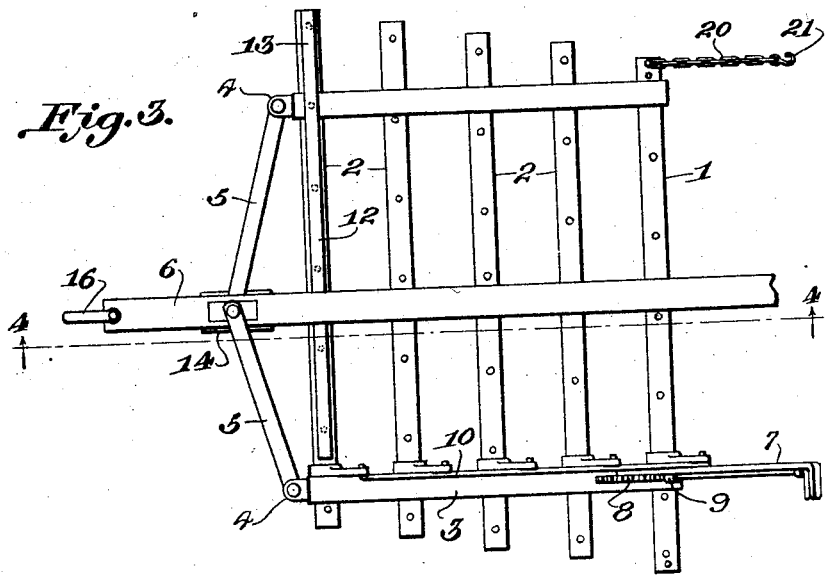
Figure 3 is an enlarged detail in top plan of one of the improved harrow sections.

Having more particular reference to the drawings, in connection with which like characters of reference will designate corresponding parts throughout, the improved harrow may be stated to comprise a plurality of sections generally indicated in their entireties herein by the numeral 1, each of said sections consisting of a plurality of transversely disposed harrow tooth carrying bars or rods 2 arranged in longitudinal stepped relation, as is clearly shown in the Figures 1 and 3, such bars being inter-connected through the medium of longitudinally disposed relatively spaced bars 3, the outermost of which have bifurcated bearings 4 formed thereon whereby pivoted connection may be had with the adjacent ends of connecting bars 5, the opposite or adjacent ends of which are adapted to be connected in the manner hereinafter more fully described, to a draft bar 6.

The harrow tooth carrying bars 2 of the various harrow sections 1 are adapted to be collectively adjusted through the medium of hand levers 7 pivotally mounted upon each section, and each being provided with a toothed segment 8 whereby such levers may be individually locked or held in adjusted positions by the engagement of movable pawls 9 with the teeth of said segments. The levers 7, as is common in the art, have suitable connection with the various tooth carrying bars 2 of the harrow sections through suitable lever connections generally shown and herein indicated by the numeral 10. In this way, it will be understood that the angular positioning of the various teeth 11 carried upon the bars 2 may be adjusted to the exact position desired during a harrowing operation.

Disposed longitudinally of and extending through portions of the lengths of the foremost tooth carrying bar 2 of each of the harrow sections 1 is a bearing strip or bar 12, one end thereof being curved downwardly, as indicated by the numeral 13, and being arranged adjacent the corresponding end of said bar 2 carrying it, while the opposite end of said strip or bar is extended to a point slightly inwardly of the corresponding end of the bar 2 carrying the same. Because of this arrangement of the gearing strip 12, it will be understood that with pivotal or swinging movement of the various harrow sections 1 with respect to the draft bar 6, as will be more fully described hereinafter, said harrow sections will be permitted to pass, without material frictional interference, and without interference from the adjacent portions of the harrow teeth, under the bar 6, as is shown in the Figure 2, inasmuch as the curved end 13 of the strip 12 will facilitate such engagement since the end thereof is arranged in planes below the draft bar 6 and by consequence, said draft bar, with swinging movement of the sections 1 with respect thereto, will be caused to ride over the curved ends and onto the body portion of the various strips 12. Hence, interference with free swinging movement of the harrow sections at the time of automatic readjustment of the same with respect to the draft bar 6 will be prevented.

The draft bar 6, aforesaid, is preferably of a length approximately corresponding to the combined lengths of the harrow sections with arrangement of the same in their opposite positions, as is shown in the Figure 1, at which time they are adapted to be drawn abreast over a field to be harrowed. This draft bar has suitable bearing brackets 14 secured to the same at equi-spaced intervals throughout its length and the upper sides of said bearings are adapted to have the adjacent ends of certain of the bars 5 pivotally connected thereto, while the adjacent ends of the remaining bars 5 are adapted to be pivotally connected to the under or lower side of said bearing brackets 14 in the manner clearly shown in the Figures 4 and 5, thus ensuring of application of an even pull or stress to those sides of a draft bar 6 during usage of the harrow.

A draft connection 15 is securely connected to the intermediate portion of the draft bar 6 and is disposed at substantially right angles thereto, as is shown in the Figure 1, while a clevis 16 is pivotally connected to one end of said bar; the connection 15 being preferably braced by means of truss rods 17 connected at their opposite ends to the end portions of the bar 6, as indicated at 18, while the adjacent ends of the same are connected to adjacent portions of said connection 15.

Figure 4:
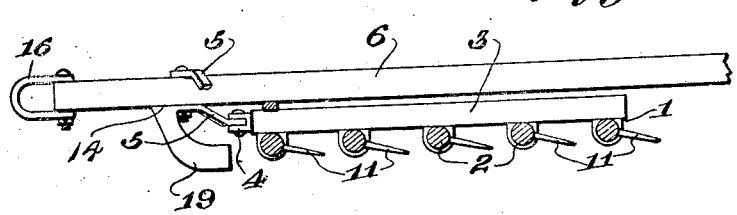
Figure 4 is a vertical longitudinal section therethrough taken on the line 4—4 of Figure 3.
Figure 5:
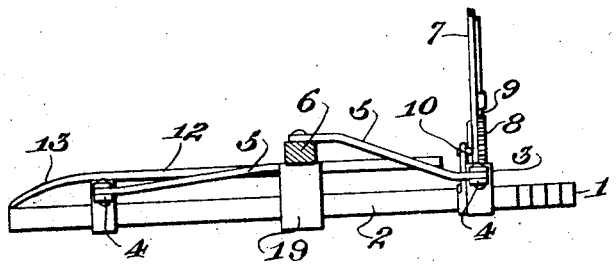
Figure 5 is a vertical transverse section through one of the harrow sections showing the connection of the same to the draft bar.

Bearing shoes 19 consisting of single pieces of metal curved as is clearly shown in the Figure 4, are adapted to be connected to the bearing brackets 14, at which points connection of the harrow sections 1 are effected, such shoes 19 being adapted to provide each of the harrow sections with effectual means for permitting the same to ride over the surface of a field being harrowed and yet, allow of engagement of the harrow teeth 11 therewith.

At those times when the harrow sections 1 are arranged abreast of each other, as is shown in the Figure 1, I preferably inter-connect the rearward ends of the same through the medium of chains 20, certain of the ends of which are pivotally secured to certain of the ends of the rearward tooth carrying bars 2, while hooks 21 are adapted to be engaged with the free ends thereof for engagement with suitable keepers formed upon the adjacent ends of the opposite or corresponding rearward tooth carrying bars 2. In this way, it will be understood that lashing, or other undesirable swinging movement of the harrow sections during their passage over a field being harrowed by the same, will be avoided.

The modus operandi of the improved harrow may be stated to be as follows:—

When the harrow is to be used, the sections 1 thereof are arranged abreast of each other in the manner as indicated in the Figure 1, at which time the rearward portions of the same are inter-connected through the medium of the detachable chain connections 20. Suitable draft means are connected to the draft connection 15, whereupon the harrow is drawn or otherwise moved over a field to be harrowed. Adjustment of the tooth carrying bars 2 so as to effect proper angular positioning of their various teeth 11 with respect to the surface of the field being harrowed, may, of course, be effected through proper adjustment of the various hand levers 7.

Upon completion of a harrowing operation and assuming that it is desired to remove the harrow from the field to another point or field, the draft means are disconnected from the draft connection 15 and are connected to the clevis 16 secured to one end of the draft bar 6. The chains 20 are now disengaged, with their hooks 21, from their respective keeper means upon the rearward tooth carrying bars 2. The draft bar is drawn by the draft means through the connection with the clevis 16, along its way, whereupon relative pivotal movement of the various harrow sections 1 with respect to the draft bar 6 will be automatically effected, said harrow sections swinging upon the bar 6 to come within the line of pull of the draft means and thereby assuming those positions as shown in the Figure 2, whereat they are obviously arranged in single file relation, that is, one following the other. With arrangement of the harrow sections 1 in the position as indicated in the Figure 2, it will be readily appreciated that the width of the harrow is materially decreased, and by consequence, that the same can be drawn without interference through narrow gate ways or other similar ways of ingress and egress to and from a field; likewise, that the harrow can be readily drawn over a narrow road without interference with obstacles along the sides thereof. When it is desired to again use the harrow, the draft means are reengaged with the draft connection 15 and the resultant line of pull upon the draft bar 6 will then cause the various harrow sections to automatically readjust themselves by swinging movement upon the draft bar 6 until they assume those positions as shown in the Figure 1. At this time, the rearward tooth carrying bars are interconnected by the detachable chains 20 whereby to avoid material relative pivotal movement therebetween.

It is to be likewise noted that because of the longitudinal stepped arrangement of the various tooth-carrying bars 2, uninterrupted pivotal or swinging movement of the harrow sections will be permitted as respects each thereof, inasmuch as the arcs of travel of the same during their swinging movement will be given ample clearance by the stepped arrangement of the bars 2. Likewise, it will be understood that because of this stepped arrangement of the tooth carrying bars 2, a slight overlapping of the forward bar of one section and the rearward bar of the opposite section will be permitted. Consequent upon this, it will be seen that the surface of the field being harrowed will be fully and completely engaged by the harrow section, and therefore, that the presence of unharrowed strips or areas in the field, subsequent to movement of the harrow thereover, will be prevented.

Manifestly, the construction shown is capable of considerable modification, and such modification as is within the scope of my claims, I consider within the spirit of my invention.

I claim:—

1. A harrow comprising a plurality of toothed sections, a draft bar, said sections being pivotally connected to said draft bar at intervals throughout its length, and draft connections on said bar, one at its intermediate portion and at substantially right angles to the same, and the other at one end thereof.

2. A harrow comprising a plurality of relatively adjustable toothed sections, a draft bar, means for pivotally connecting said sections to said draft bar at equi-spaced intervals throughout its length, and draft connections on said bar, one at its intermediate portion and at substantially right angles to the same, and the other at one end thereof.

3. A harrow comprising a plurality of toothed sections, a draft bar, said sections being pivotally connected to such draft bar at intervals throughout its length, draft connections on said bar, one at its intermediate portion and at substantially right angles to the same, and the other at one end thereof and in substantial longitudinal alignment therewith, and means for detachably interconnecting the rearward portions of said sections, at times.

4. A harrow comprising a plurality of toothed sections, a draft bar, means for pivotally connecting the forward end of each of said sections to said draft bar at intervals throughout its length, a bearing strip arranged upon and disposed longitudinally of certain of the tooth carrying bars of each of said sections having one end thereof curved downwardly and adapted to pass under the lower side of said draft bar, at times, and draft connections on said bar, one at its intermediate portion and at substantially right angles to the same, and the other at one end thereof.

5. A harrow comprising a plurality of sections, each consisting of transversely disposed relatively adjustable tooth carrying bars, said bars being arranged in longitudinal stepped relation, means for pivotally connecting each of said sections to said bars at equi-spaced intervals throughout its length, and draft connections on said bar, one at its intermediate portion and at substantially right angles to the same, and the other at one end thereof.

6. A harrow comprising a plurality of sections, each of said sections consisting of a plurality of transversely disposed adjustable and inter-connected tooth carrying bars, longitudinally disposed bars interconnecting said transverse tooth carrying bars, bearings on certain of the ends of said longitudinal bars, connecting bars pivotally received within said bearings having their adjacent ends pivotally connected to the upper and lower sides respectively of said draft bar, a longitudinally disposed bearing strip carried upon certain of the tooth carrying bars of each of said sections having one end thereof curved downwardly and adapted to pass under the lower side of said draft bar, at times, and draft connections on said bar, one at its intermediate portion and at substantially right angles to the same, and the other at one end thereof.

7. A harrow comprising a plurality of sections, each of said sections consisting of a plurality of transversely disposed relatively adjustable tooth carrying bars, longitudinally disposed bars interconnecting said transverse tooth carrying bars, certain of the longitudinal bars having bearings formed on certain of their ends, connecting bars pivotally engaged in said ends, a draft bar, the adjacent ends of said connecting bars being pivotally connected to the upper and lower sides respectively of said draft bar at spaced intervals throughout its length, each of the transverse tooth carrying bars of said sections being arranged in relative longitudinal stepped relation, bearing shoes carried upon the under side of the draft bar adjacent the various points of connection of the connecting bars therewith, and draft connections on said draft bar, one at its intermediate portion and at substantially right angles to the same, and the other at one end thereof.

8. A harrow comprising a plurality of sections, each consisting of relatively adjustable transverse tooth carrying bars, longitudinal bars interconnecting such transverse tooth carrying bars, certain of the ends of the outermost of said longitudinal bars having bearings thereon, connecting bars pivotally engaged in said bearings, a draft bar, the adjacent and remaining ends of said connecting bars being pivotally connected to the upper and lower sides respectively of said draft bar at equi-spaced intervals throughout its length, each of said transverse tooth carrying bars of the various sections being arranged in relative longitudinal stepped relation, a bearing strip secured to the upper side of one of the tooth carrying bars of each of said sections having one end thereof curved downwardly and adapted to ride under the lower side of said draft bar, at times, bearing shoes carried on the under side of said draft bar adjacent the points of pivotal connection of said connecting bars therewith, means for detachably interconnecting the rearward portions of the various sections, at times, and draft connections on said draft bar, one at its intermediate portion and at substantially right angles to the same and the other at one end thereof.

In witness whereof I have hereunto set my hand.

CHARLES E. WEBBER.